United States Patent Office 3,437,635
Patented Apr. 8, 1969

3,437,635
POLYAMIDE ACIDS AND POLYAMIDES FROM SUBSTITUTED PYROMELLITIC DIANHYDRIDE
Stanley Tocker, Wilmington, Del., assignor to E. I. du Pont de Nemours and Company, Wilmington, Del., a corporation of Delaware
No Drawing. Filed May 4, 1965, Ser. No. 453,207
Int. Cl. C08g 20/32
U.S. Cl. 260—47
2 Claims

ABSTRACT OF THE DISCLOSURE

Polyamide acids and polyimides characterized by radicals of certain dianhydrides, the radicals having the following structure:

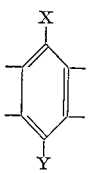

where X and Y are as defined hereinafter, useful as film and for coating applications.

This invention relates to polyamide acids and polyimides. More particularly, this invention is directed to a novel class of polymeric polyamide acids and polyimides and to their preparation.

These polymers are readily prepared by reaction of at least one of certain substituted pyromellitic dianhydrides and at least one of certain organic diamines.

The dianhydrides are following:

(1)
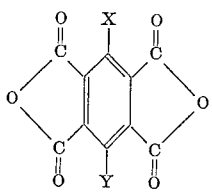

where X is selected from the group consisting of —NO₂, —CF₃

$$-A, \quad -\overset{O}{\underset{\parallel}{C}}-A, \quad -\overset{O}{\underset{\parallel}{\underset{\parallel}{S}}}-A, \quad -NR'R'', \quad -NR'-\overset{O}{\underset{\parallel}{C}}-R''$$

and

—SiR′R″R‴ where A is selected from the group consisting of

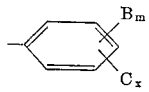

and

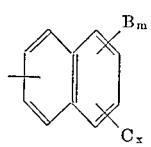

where:
B is selected from the group consisting of —NO₂, —CF₃, phenyl, —NR′R″ and —SiR′R″R‴;
C is selected from the group consisting of chlorine, bromine and fluorine;
$m$ is an integer of 0 through 2 both inclusive;

$x$ is an integer of 0 through 5 both inclusive;
the sum of $m$ plus $x$ being no greater than 5;
R′, R″ and R‴ are each separately selected from the group consisting of alkyl of 1 through 4 carbons and phenyl; and
Y is separately selected from the same group as X and hydrogen.

These dianhydrides can be prepared by introduction into the durene nucleus of the substituent or substituents desired on the dianhydride ring, to give the following durene derivative:

(2)
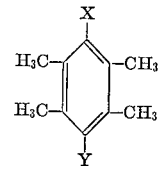

followed by oxidation of the four methyl groups to carboxy groups and subsequent dehydration to the dianhydride. For example, reaction of durene with benzoyl chloride under Friedel-Craft conditions produces benzoyl durene and ultimately benzoyl pyromellitic acid and dianhydride. Likewise, nitration of durene gives the desired nitro or dinitro derivative. By conventional reaction of the durene ring with electrophilic reagents, one or two phenyl substituents, or CF₃, or —NR′R″ or —SiR′R″ can be introduced into the durene nucleus.

Reaction of at least one of the above dianhydrides with at least one organic diamine according to methods described hereinafter provides a novel class of useful polyamide acids. Within this class are polymers which, compared with known polyamide acids, have greater thermoplasticity, greater solubility, some degree of fusibility and heat-sealability, and are amenable to processing in the comonomer and less expensive solvents.

The dianhydrides of Formula 1 can be reacted with diprimary amines by methods known in the art to produce the corresponding polyamide acids, which in turn are convertible by heat or chemical dehydration into the corresponding polyimides. Alternatively, the substituted tetraacid can be converted into the corresponding diester diacid chloride or tetraester, which react with diamines to produce polyimides. The diimides, which can be made easily from the dianhydrides by reaction with ammonia, react with diamines to produce polyimides.

These substituted polypyromellitimides have improved thermoplasticity over aromatic polyimides of unsubstituted pyromellitic dianhydride and thus are more fusible and sealable.

The preparation of the polyamide acids of this invention involves reacting at least one dianhydride of Formula 1 above with at least one organic diamine having the formula H₂N—R—NH₂ where R is a divalent aromatic radical (arylene), preferably one of the following groups: phenylene, naphthylene, biphenylene, anthrylene, furylene, benzfurylene, and (3)
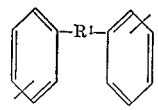

where R¹ is alkylene of 1–3 carbon atoms, oxygen, sulfur, or one of the following:

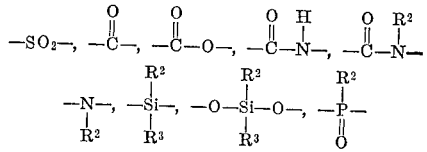

and

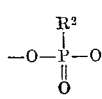

wherein $R^2$ and $R^3$ are alkyl or aryl, and substituted groups thereof.

Among the diamines suitable for use in the present invention are: meta-phenylene diamine; paraphenylene diamine; 2,2-bis(4-aminophenyl)propane; 4,4'-diaminodiphenyl methane; 4,4'-diaminodiphenyl sulfide; 4,4'-diaminodiphenyl sulfone; 3,3'-diaminodiphenyl sulfone; 4,4'-diaminodiphenyl ether; 2,6-diaminopyridine; bis(4-aminophenyl)diethyl silane; bis(4-aminophenyl)diphenyl silane; benzidine; 3,3'-dichlorobenzidine; 3,3'-dimethoxybenzidine; bis(4-aminopheyl)-ethyl phosphine oxide; 4,4'-diaminobenzophenone; bis(4-aminophenyl)phenyl phosphine oxide; bis(4-aminophenyl)-N-butylamine; bis(4-aminophenyl)-N-methylamine; 1,5-diaminonaphthalene; 3,3'-dimethyl-4,4'-diaminobiphenyl; N-(3-aminophenyl)-4-aminobenzamide; 4-aminophenyl-3-aminobenzoate; and mixtures thereof.

The diamine and dianhydride described above are reacted together to prepare a polyamide acid having an inherent viscosity of at least 0.1, and preferably 0.3–5, in an organic solvent for at least one of the reactants, the solvent being inert to the reactants, preferably under substantially anhydrous conditions, at a temperature below about 175° C. and for a time sufficient to provide in most instances at least 50% by weight of the corresponding polyamide acid in the form of a shapeable composition. The polyamide acid can then readily be converted to the polyimide, the polyimide also having an inherent viscosity of at least 0.1 and preferably 0.3–5.

The product of the dianhydride-diamine reaction is a polyamide acid having the following formula:

(4)

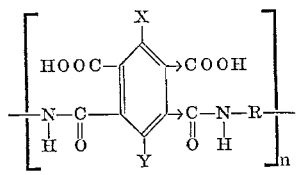

where the arrows denote isomerism, X, Y and R are as defined above and where $n$ is an integer sufficient to provide a polyamide acid having an inherent viscosity of at least 0.1 and preferably 0.3–5 as measured as an 0.5% by weight solution in N,N-dimethylacetamide at 30° C.

In the preparation of the polyamide acid, it should be understood that it is not necessary that the polymeric component of the reaction product composition be composed entirely of the polyamide acid. This is particularly true since conversion to the polyimide is contemplated subsequent to shaping the polyamide acid composition. To retain its shapeability, it has been found that in most instances the polymeric component of the composition should contain at least 50% by weight of the polyamide acid and in a few instances less than 50% by weight of the polyamide acid in the polymeric component will operate.

In the selection of a specific time and a specific temperature for forming the polyamide acid of a specified diamine and a specified dianhydride or tetraacid, several factors will be considered. The maximum temperature will depend on the reactants used, the particular solvent, the percentage of polyamide acid desired in the final composition and the minimum period of time that one desires for the reaction. For most combinations of reactants, compositions of 100% polyamide acid can be formed by conducting the reaction below 100° C. However, temperatures up to 175° C. can be used to provide shapeable compositions. The particular temperature below 175° C. that must not be exceeded for any particular combination of reactants, solvent and reaction time to provide a reaction product composed of sufficient polyamide acid to be shapeable will vary but can be determined by any person of ordinary skill in the art in accordance with the teachings herein. However, to obtain the maximum inherent viscosity, i.e., maximum degree of polymerization, for any particular combination of reactants, solvent, etc., and thus produce shaped articles such as films and filaments of optimum toughness, the temperature throughout the reaction should be maintained below about 60° C., preferably below 50° C.

The degree of polymerization of the polyamide acid is subject to deliberate control. The use of equal molar amounts of the reactants under the prescribed conditions provides polyamide acids of very high molecular weight. The use of either reactant in large excess limits the extent of polymerization. Besides using an excess of one reactant to limit the molecular weight of the polyamide acid, a chain terminating agent such as phthalic anhydride may be used to "cap" the ends of the polymer chains.

In the preparation of the polyamide acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{viscosity of solution}}{\text{viscosity of solvent}}}{C}$$

where $C$ is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the other reactant. For forming the composition into shaped articles, it has been found that the most successful results are obtained when the solvent represents at least 60% by weight of the final polymeric solution. That is, the solution should contain 0.05–40% by weight of the polymeric component.

The solvents useful in the solution polymerization process for synthesizing the polyamide acid compositions are the organic solvents whose functional groups do not react with either of the reactants to any appreciable extent. Besides being inert to the system, and preferably being a solvent for the polyamide acid, the organic solvent must be a solvent for at least one of the reactants and preferably for both of the reactants. To state it another way, the organic solvent is an organic liquid other than either reactant or homologs of the reactants that is a solvent for at least 1 reactant and contains functional groups, the functional groups being other than monofunctional primary and secondary amino groups and other than the monofunctional dicarboxylanhydro groups.

The normally liquid organic solvents of the N,N-dialkylcarboxylamide class are particularly useful as solvents in the preparation of the polyamide acids of this invention. The preferred solvents are the lower molecular weight members of this class, particularly N,N-dimethylformamide and N,N-dimethylacetamide. They may easily be removed from the polyamide-acid and/or polyamide acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are dimethylsulfoxide, N-methyl-2-pyrrolidone, tetramethyl urea, pyridine, dimethylsulfone, hexamethylphosphoramide, tetramethylene sulfone, formamide, N-methlyformamide and butyrolactone. The solvents can be used alone, in combinations of solvents, or in combination with other solvents such as benzene, benzonitrile, dioxane, xylene, toluene and cyclohexane.

The novel polyamide-acids of this invention can be used immediately or stored for subsequent use. They are useful as coating compositions which can be applied to a variety of substrates, for example, metals, e.g. copper, brass, aluminum, steel, etc., the metals in the form of sheets, fibers, wires, screening, etc.; glass in the form of sheets, fibers, foams, fabrics, etc.; polymeric materials, e.g. cellulosic materials such as cellophane, wood, paper, etc., polyolefins such as polyethylene, polypropylene, polystyrene, etc. polyamide, polyesters such as polyethylene terephthalate, etc., perfluorocarbon polymers such as polytetrafluoroethylene, copolymers of tetrafluoroethylene with hexafluoropropylene, etc., polyurethanes, polyimides, all polymeric materials in the form of sheets, fibers, foams, woven and non-woven fabrics, screening, etc.; leather sheets; etc. These coatings can then be converted to polyimide coatings by any convenient method. Such coating compositions can if desired be pigmented with such compounds as titanium dioxide in amounts of about 5–200% by weight.

The novel polyamide acid products of this invention are preferably used by shaping into a useful article, followed by conversion to the polyimide having the following formula:

(5)
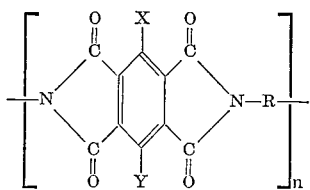

where X, Y, R and $n$ have the same meanings as above.

It should also be understood that the polyamide acid polymers can be modified with inert materials prior to or subsequent to shaping. These modifying agents may be selected from a variety of types such as pigments, dyes, inorganic and organic fillers, electrically conductive carbon black and metal particles, abrasives, delectrics, lubricating polymers, etc.

Shaping can be accomplished by extrusion through an appropriate orifice or slot to form filaments, rods, flat sheets, tubing, or the like. Alternatively, shaping can be accomplished by casting unto flat or curved surfaces to form sheets, films, etc., or placed in molds of the desired shape.

The polyimide acids can be converted to the corresponding polyimides by heat treatment or chemical treatment or other suitable means. In the heat treatment, temperatures above about 50° C. and preferably above about 125° C. will be used.

A second process useful for conversion of the polyamide acid involves treating the polyamide acid with a dehydrating agent alone or in combination with a tertiary amine, e.g. acetic anhydride or an acetic anhydride-pyridine mixture. The intermediate preferably in the form of a shaped article can be treated in a bath containing the acetic anhydride-pyridine mixture. The ratio of acetic anhydride to pyridine can vary from just above zero to infinite mixtures.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydride and ketene. Ketenes are regarded as anhydrides of carboxylic acids, (ref. Bernthsen-Sudborough, textbook of Organic Chemistry, Van Nostrand (1935), page 861 and Hackh's Chemical Dictionary, Blakiston (1953), page 468) derived from drastic dehydration of the acids.

The aromatic monobasic acid anhydrides include the anhydride of benzoic acid and those of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratric acid, trimethoxy benzoic acid; alpha- and beta-naphthoic acids; and biphenylcarboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine can be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts.

As a third process of conversion, a combination treatment can be used. The polyamide acid can be partially converted to the polyimide in a chemical conversion treatment and then cyclization to the polyimide completed by subsequent heat treatment. The conversion of the polyamide acid to the polyimide in the first step can be limited if it is desired to shape the composition at this stage. After shaping, the completion of the cyclization can be accomplished.

Following conversion to the polyimide, if the polyimide is heated to a temperature of 300°–500° C. for a short interval (15 seconds to 2 minutes), improvements in the thermal and hydrolytic stabilities of the polyimide structure are obtained as well as an increase in inherent viscosity.

This invention will be more clearly understood by reference to the following examples wherein parts and percentages are by weight unless otherwise indicated. These examples illustrate specific embodiments of the present invention and should not be construed to limit the invention in any way.

EXAMPLE 1

Preparation of benzoyldurene

A solution of 50 grams of durene in 150 milliliters of carbon disulfide was slurried with 124 grams of aluminum chloride. Then 25.3 grams of benzoyl chloride was added dropwise with vigorous stirring over a 30 minute period. The mixture was refluxed one hour and allowed to stand overnight. The reactor was emptied into a solution of 40 milliliters of 39% hydrochloric acid in one liter of ice water, followed by extraction of the organic phase with benzene. The combined benzene extracts were extracted with water to remove residual acid and were then dried over anhydrous sodium sulfate. The benzene was removed in a vacuum oven, leaving a solid residue. Recrystallization from 95% aqueous ethanol gave a white product (62 grams) which had a melting point of 199° C.

*Analysis.*—Calcd. for $C_{17}H_{18}O$: C, 85.67; H, 7.61. Found: C, 86.16; H, 7.68.

Oxidation of benzoyldurene to benzoylpyromellitic Dianhydride

A mixture of benzoyldurene (80 grams), 90% nitric acid (262 grams) and water (472 milliliters) was heated over a 3 hour period to 180° C. and held at a temperature of 180° C., pressure 200–300 pounds per square inch, for an additional 3 hours. The aqueous nitric acid and other low boiling products were removed in a vacuum oven held at 100–125° C. and 15 millimeters pressure. The solid residue was dissolved in refluxing acetic anhydride (135 milliliters), treated with 100 milliliters of glacial acetic acid, and cooled to give about 40 grams of white crystalline material, m.p. 275–276° C. after drying in a vacuum oven.

*Analysis.*—Calcd. for $C_{17}H_6O_7$: C, 63.36; H, 1.88. Found: C, 62.74; H, 1.84.

Preparation of polyamide acid solution and polyimide film from benzoylpyromellitic dianhydride and 4,4'-oxydianiline A solution of 1.2 grams of 4,4'-oxydialine in 24.6 milliliters of dimethylacetamide was treated with 2 grams of benzoylpyromellitic dianhydride with stirring under anhydrous conditions. Stirring was continued overnight. The inherent viscosity of the resultant polyamide acid (0.5% by weight in dimethylacetamide at 30° C.) was 0.96.

The above polyamide acid solution was placed on a glass plate and heated in an air oven at 100° C. until most of the dimethylacetamide had evaporated. The temperature was raised to 400° C. at which temperature the film was heated for 10 minutes. The resultant yellow polyimide film could be creased without cracking. Between 400° and 500° C. the film was somewhat limp. The thermal gravimetric analysis curve in air was similar to that for the corresponding polypyromellitimide film.

EXAMPLE 2

Following the procedures of Example 1, the corresponding dianhydride is prepared and converted into its polyamide-acid and polyimide by substitution in the second and third parts of Example 1 of each of the following substituted durenes:

3-(alpha-naphthoyl) durene
3,6-dinitro durene
3-phenyl durene
3,6-diphenyl durene
3-trifluoromethyl durene
3-trimethylsilicyl durene

EXAMPLE 3

To a solution of 1.98 grams of 4,4'-diaminodiphenylmethane in 46 grams of N,N-dimethylacetamide was added 3.22 grams of benzoylpyromellitic dianhydride, and the mixture was stirred under anhydrous conditions. The inherent viscosity of the resulting polyamide acid (0.5% by weight in dimethylacetamide at 25° C.) was 0.66. Films were cast and dried for 30 minutes at 100° C. These were subsequently converted to polyimide films by heating at 160° C. for 10 minutes and at 300° C. for 30 minutes.

EXAMPLE 4

Benzoyl pyromellitic dianhydride reacts with each of the following diamines to produce the corresponding polyamide-acid, which converts to reaction with acetic anhydride plus a tertiary amine to give the corresponding polyimide:

m-Phenylene diamine
2,2-bis(4-aminophenyl) propane
bis(4-aminophenyl) sulfone
4,4'-diamino benzophenone The foregoing examples can be repeated as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. The polyamide acid of benzoylpyromellitic dianhydride and 4,4'-oxydianiline, said polyamide acid having an inherent viscosity of at least 0.1 as measured as an 0.5% by weight solution in N,N-dimethylacetamide at 30° C.

2. The polyimide, in the form of self-supporting film, of benzoylpyromellitic dianhydride and 4,4'-oxydianiline.

References Cited

UNITED STATES PATENTS

| | | | |
|---|---|---|---|
| 3,179,614 | 4/1965 | Edwards | 260—78 |
| 3,179,634 | 4/1965 | Edwards | 260—78 |
| 3,299,101 | 1/1967 | Tocker | 260—78 |

WILLIAM H. SHORT, *Primary Examiner.*

H. D. ANDERSON, *Assistant Examiner.*

U.S. Cl. X.R.

51—298; 117—161; 260—32.6, 37, 65, 78, 346.3, 346.4